United States Patent [19]

Nemzek et al.

[11] Patent Number: 4,464,496
[45] Date of Patent: Aug. 7, 1984

[54] NON-YELLOWING POLYMER COMPOSITION

[75] Inventors: Thomas L. Nemzek, Houston, Tex.; Brendan J. Geelan, East Haven, Conn.

[73] Assignee: Uniroyal, Inc., New York, N.Y.

[21] Appl. No.: 362,221

[22] Filed: Mar. 26, 1982

[51] Int. Cl.$^3$ .......................... C08K 5/20; C08K 5/34
[52] U.S. Cl. ....................................... 524/91; 524/99; 524/102; 524/131; 524/219; 524/222; 524/289; 525/86
[58] Field of Search ................ 524/99, 131, 219, 222, 524/289, 91, 102; 525/86, 75; 546/222

[56] References Cited

U.S. PATENT DOCUMENTS

| 3,367,870 | 2/1968 | Spivack | 524/131 |
|---|---|---|---|
| 3,502,613 | 3/1970 | Berger | 524/291 |
| 3,642,690 | 2/1972 | Mills | 524/171 |
| 3,893,968 | 7/1975 | Shiga et al. | 524/304 |
| 3,962,377 | 6/1976 | Spivack | 524/117 |
| 4,110,304 | 8/1978 | Gilg et al. | 524/99 |
| 4,154,723 | 5/1979 | Hirsch et al. | 524/219 |
| 4,185,003 | 1/1980 | Hoeschele | 524/222 |
| 4,202,948 | 5/1980 | Peascoe | 525/86 |
| 4,305,868 | 12/1981 | Wheeler et al. | 524/219 |
| 4,341,879 | 7/1982 | Sugio et al. | 524/222 |

OTHER PUBLICATIONS

Scott, Developments in Polymer Stabilisation-1, Chapter 8, pp. 261, 306 and 307.

Primary Examiner—John Kight, III
Assistant Examiner—R. A. White
Attorney, Agent, or Firm—James J. Long; Bert J. Lewen

[57] ABSTRACT

A non-yellowing antioxidant-UV stabilizer combination especially useful in AES polymers comprising
(A) at least one antioxidant selected from the group consisting of:
  (i) a thiodialkylene bis-(3,5-dialkyl-4-hydroxy) hydrocinnamate antioxidant;
  (ii) An N,N'-alkylene bis-(3,5-dialkyl-4-hydroxy) hydrocinnamamide antioxidant;
  (iii) an O,O-dialkyl-3,5-dialkyl-4-hydroxybenzyl phosphonate antioxidant;
  (iv) an oxamidobis alkyl (3,5)-dialkyl-4-hydroxyphenyl) propionate antioxidant; and
  (v) a [3-(3,5-dialkyl-4-hydroxyphenyl)propionamido-]alkyl stearate antioxidant; and
(B) a UV stabilizer package comprising:
  (vi) at least one UV stabilizer of the hindered amine type, with or without
  (vii) at least one UV absorber.

8 Claims, No Drawings

NON-YELLOWING POLYMER COMPOSITION

This invention relates to a non-yellowing polymer composition and certain antioxidant material.

Various useful polymer compositions suffer from the disadvantage that they tend to turn yellow. In certain cases the formation of the yellow color is believed to be the result of an interaction between antioxidant and hindered amine UV stabilizer in the polymer composition. The present invention provides non-yellowing combinations of antioxidant and hindered amine UV stabilizer. Although the invention is particularly useful in "AES" polymers, the invention may also be applied to other polymers normally subject to similar yellowing.

In one aspect the invention is directed to improved impact-resistant thermoplastic "AES" blends prepared by:

(I) graft copolymerizing styrene and acrylonitrile on ethylene-propylene-non-conjugated diene rubber (EPDM) in the presence of an antioxidant; and (II) blending the resulting graft copolymer with separately prepared styrene-acrylonitrile resin, as disclosed for example in U.S. Pat. No. 4,202,948 issued to Warren J. Peascoe on May 13, 1980.

It has been desired to improve upon prior AES compositions of the foregoing kind from the standpoint of resistance to adverse effects of outdoor exposure. For example it has been observed that samples of certain such prior AES blends which had been exposed outdoors for a short period of time (1 to 3 months in Florida) would develop a yellow color after a few weeks storage indoors. The same samples which were kept outdoors for longer than about three months would not yellow when stored indoors. Likewise, samples which were never placed outdoors did not yellow and samples kept outdoors did not turn yellow. The formation of the yellow color was traced to an interaction between the particular polymerization antioxidant used during preparation of the graft copolymer (Irganox 1076 [trademark]; octadecyl 3,5-di-tert-butyl-4-hydroxyhydrocinnamate) and a UV stabilizer (Tinuvin 770 [trademark], bis(2,2,6,6-tetramethyl-4-piperidyl)sebacate) added when blending the graft copolymer with separately prepared styrene-acrylonitrile resin. Samples not containing the Tinuvin 770 did not yellow but removing it from the formulation was unacceptable because it was effective in maintaining mechanical properties and minimizing chalking of the surfaces of pigmented samples during outdoor exposure.

The present invention is directed to a polymer composition that does not suffer from yellowing upon ageing and yet maintains its desirable physical properties, containing antioxidant material (A) comprising one or more of the following:

(i) a thiodialkylene bis-(3,5-dialkyl-4-hydroxy) hydrocinnamate as represented by such commercially available materials as thiodiethylene bis-(3,5-di-tert-butyl-4-hydroxyl) hydrocinnamate (Irganox 1035 [trademark]), which has the structural formula

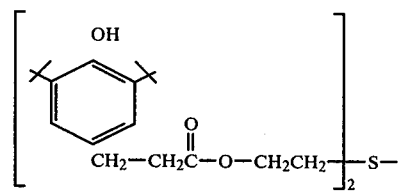

(ii) an N,N'-alkylene bis(3,5-dialkyl-4-hydroxy hydrocinnamamide) as represented by such commercially available materials as N,N'-hexamethylene bis(3,5-di-tert-butyl-4-hydroxyhydrocinnamamide (Irganox 1098; trademark), which has the structural formula

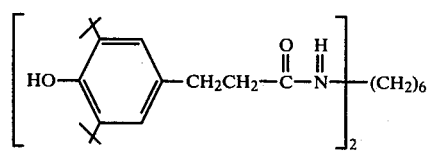

(iii) an O,O-dialkyl-3,5-di-alkyl-4-hydroxybenzyl phosphonate, as represented by such commercially available materials as O,O-di-n-octadecyl-3,5-di-tert-butyl-4-hydroxybenzyl phosphonate (Irganox 1093 [trademark]) which has the structural formula

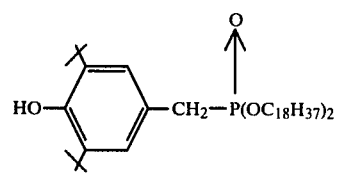

(iv) an oxamide antioxidant having the structural formula:

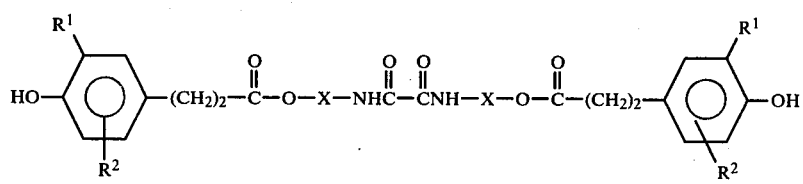

in which case $R^1$ independently is alkyl having up to about 8 carbon atoms including a tertiary carbon atom directly linked to the phenolic ring on which that $R^1$ is a substituent, each $R^2$ independently is H or alkyl having up to about 8 carbon atoms, and each X independently is a divalent hydrocarbon radical containing up to about 12 carbon atoms including from 1 to about 10 carbon atoms forming the shortest chain linking to the adjacent

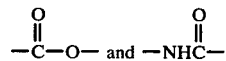

radicals in said compound, particularly an oxamido bis alkyl (3,5-dialkyl-4-hydroxyphenyl)propionate, as represented by such commercially available materials as 2,2'-oxamidobis ethyl,3(3,5-di-tert-butyl-4-hydroxyphenyl)propionate (Naugard XL-1 [trademark]);

(v) a 2-[3-(3,5-dialkyl-4-hydroxyphenyl)propionamido]alkyl stearate, such as 2-[3-(3,5-di-tertiary-butyl-4-hydroxyphenyl)propionamido]ethyl stearate or 2-[3-(3,5-di-tertiary-butyl-4-hydroxyphenyl)propionamido]-2-methylpropyl stearate.

In one aspect the invention also contemplates the use of additional stabilizer material (B) comprising a UV stabilizer package made up of the following:

(vi) at least one UV stabilizer of the hindered amine type such as for example an alkyl substituted piperidyl ester, e.g., bis(1,2,2,6,6-pentamethyl-4-piperidinyl)-n-butyl-(3,5-di-tert-butyl-4-hydroxybenzyl)malonate, or equivalent products as represented by such commercially available materials as Tinuvin (trademark) 770 or 144 or the like; and, (vii) optionally, at least one UV absorber, such as for example a benzotriazole type of UV absorber, especially a hydroxyalkylphenyl benzotriazole, as represented by such commercially available materials as 2(2'-hydroxy-5'-methylphenyl)benzotriazole (Tinuvin P; trademark), and the like; also 2-(hydroxy-5-t-octylphenyl)benzotriazole (Cyasorb UV 5411; trademark), 2-(3',5'-di-tert-butyl-2'-hydroxyphenyl)-5-chlorobenzotriazole (Tinuvin 327; trademark), or a benzophenone type of UV absorber, especially a 2-hydroxy-4-alkyl benzophenone, as represented by such commercially available materials as 2-hydroxy-4-n-octylbenzophenone (Cyasorb UV 531; trademark), or a benzoate type of UV absorber, especially a 2,4-dialkylphenyl-3,5-dialkyl-4-hydroxybenzoate, as represented by such commercially available materials as 2,4-di-tert-butylphenyl 3,5-di-tert-butyl-4-hydroxybenzoate (AM 340; trademark) and the like.

The invention has particular reference to compositions containing (B) at least one of the hindered amine type UV stabilizers (vi), with or without a UV absorber ((vii), along with (A) at least one of the antioxidants (i), (ii), (iii), (iv) or (v).

The invention involves using antioxidant/UV stabilizer materials of the foregoing kind to protect any of the polymers described above, particularly a graft copolymer composition made by graft copolymerizing resin-forming monomeric material, especially vinyl aromatics, alkenoic nitriles, esters or acids, and the like (e.g., styrene, acrylonitrile, alkyl acrylates, or mixtures thereof), on a rubbery spine which is an olefin-type rubber, such as saturated ethylene-propylene copolymer rubber (EPM) or unsaturated olefin rubber such as ethylene-propylene-non-conjugated diene terpolymer rubber (EPDM) in which such dienes as dicyclopentadiene, ethylidene norbornene, hexadiene or the like may be used. If desired all of the resinous component (e.g. styrene-acrylonitrile) in such a graft copolymer composition may be produced in situ during the graft copolymerization, although in practice it may be preferred to prepare some of the resin (e.g. styrene-acrylonitrile copolymer resin) separately and thereafter blend such separately prepared resin with the product of the graft copolymerization to make the final composition.

The graft copolymerization may be carried out in conventional manner, for example in emulsion, in solution, in suspension, or by a mass polymerization process, or various combinations thereof.

The above-described antioxidant materials (i), (ii), (iii), (iv), (v) and UV stabilizer materials (vi), (vii) may be added to the graft copolymer composition and mixed in uniformly in conventional manner at any suitable stage in the preparation of the composition. In accordance with one preferred practice, at least one of the antioxidant materials (i), (ii), (iii), (iv), (v) are added to the graft polymerization mixture at the start of the graft polymerization step, while the UV stabilizer materials (vii) and/or (vi) are added after the graft polymerization, for example at the time that separately prepared resin is blended with the product of the graft polymerization step.

The amounts of antioxidant material (A) and stabilizer material (B) employed may be as in conventional practice, i.e., small effective amounts of each.

In a preferred aspect, the invention is based on the unexpected discovery that the above-described prior difficulties can be overcome in a particularly advantageous manner by (I) using, as the antioxidant (A) during the graft copolymerization step, a mixture of a type (i) antioxidant as described above, especially thiodiethylene bis-(3,5-di-tert-butyl-4-hydroxy)hydrocinnamate (Irganox 1035) and a type (iii) antioxidant as described above, especially O,O-di-n-octadecyl-3,5-di-tert-butyl-4-hydroxybenzyl phosphonate (Irganox 1093) for example in weight ratio of 1:3 to 3:1, preferably in approximately 1:1 ratio; and (II) using, as a UV stabilizer (B) added when blending the graft copolymer with additional styrene-acrylonitrile resin, a hindered amine type (vi) UV stabilizer as described above, especially bis(2,2,6,6-tetramethyl-4-piperidyl)sebacate (Tinuvin 770) or bis(1,2,2,6,6-pentamethyl-4-piperidinyl)-n-butyl-(3,5-di-tert-butyl-4-hydroxybenzyl)malonate (Tinuvin 144), with or without a type (vii) UV absorber as described above, especially 2-(2'-hydroxy-5'-methylphenyl)benzotriazole (Tinuvin P).

In still another preferred aspect the invention overcomes the prior difficulties by (I) using, as the antioxidant (A) during the graft copolymerization step, a type (iv) antioxidant as described above, especially 2,2'-oxamido-bis-ethyl-3-(3,5-di-tert-butyl-4-hydroxyphenyl)propionate (Naugard XL-1); and (II) using, as a UV stabilizer (B) added when blending the graft copolymer with additional styrene-acrylonitrile resin, a type (vi) UV stabilizer as described above, especially bis(1,2,2,6,6-pentamethyl-4-piperidinyl)-n-butyl-(3,5-di-tert-butyl-4-hydroxybenzyl)malonate (Tinuvin 144), with or without a type (vii) UV absorber as described above, especially 2-(2'-hydroxy-5'-methylphenyl)benzotriazole (Tinuvin P).

The resulting blends of the invention are high impact gum plastics which retain useful impact strength and other mechanical properties when exposed to an outdoor environment. The use of the described antioxidant mixture in the preparation of the graft copolymer surprisingly insures that the gum plastic blend will have good initial color and will be resistant to yellowing when exposed outdoors.

As indicated, the impact-resistant thermoplastic gum plastic blend of the invention is preferably prepared by blending two separate components, namely:

(I) a graft copolymer of styrene and acrylonitrile on EPDM rubber, particularly ethylene-propylene-5-ethylidene-2-norbornene terpolymer rubber; and (II) separately prepared styrene-acrylonitrile resin.

Examples of the graft copolymer component (I) and the separately prepared resin component (II) are described in more detail in U.S. Pat. No. 4,202,948 referred to above. The preferred graft copolymer (I) is prepared by graft copolymerizing (a) styrene and acrylonitrile in weight ratio of 80/20 to 65/35 on (b) a rubbery terpolymer of ethylene, propylene and 5-ethylidene-2-norbornene in which the weight ratio of ethylene to propylene is within the range of from 80/70 to 20/80. The Mooney viscosity of the terpolymer rubber (b) is preferably from 55 to 78 ML-4 at 257° F. and the iodine number of the rubber (b) preferably is from 15 to 40. The amount of (a) acrylonitrile/styrene is about 50% based on the weight of (a) plus (b).

The preferred separately prepared resin (II) is a copolymer of styrene and acrylonitrile in weight ratio of 80/20 to 65/35 having an intrinsic viscosity in dimethylformamide at 30° C. of at least 0.4. The amount of resin (II) in the blend is sufficient to provide an over-all ratio of resin to rubber in the range from 90/10 to 50/50.

In a particularly valuable form of the invention, there is present during the graft copolymerization stage an antioxidant mixture of Irganox 1035 and Irganox 1093 in weight ratio of from about 1:3 or less to about 3:1 or more. As an alternative, Naugard XL-1 may be used. The total amount of such antioxidant present is preferably from about 0.25 part or less to 3 parts or more, per 100 parts by weight of the EPDM rubber employed in making the graft.

The invention typically further involves adding during the blending of the graft copolymer (I) with the separately prepared resin (II), a UV stabilizer mixture of Tinuvin 770 or Tinuvin 144 and Tinuvin P, in weight ratio of from 1:3 or less to 3:1 or more. The amount of combined Tinuvin 770 or Tinuvin 144 plus Tinuvin P is usually from 0.2 part or less to 2 parts or more, per 100 parts by weight of (I) graft copolymer plus (II) separately prepared resin.

The antioxidant-UV stabilizer combination of the invention may also be useful in various other polymers including thermoplastic resins such as polystyrene and other styrenics including styrene-acrylonitrile, styrene-methyl methacrylate, styrene-maleic anhydride, styrene-acrylonitrile-maleic anhydride, acrylics, polyvinyl chloride, polycarbonate, nylons, polyacetals, thermoplastic polyesters such as polyethylene terephthalate and polyolefins such as polyethylene and polypropylene. The non-yellowing antioxidant/UV stabilizer combinations of the present invention may be useful in the above-mentioned resins or blends thereof in the presence or absence of impact modifiers, fillers or reinforcements. The antioxidant/UV stabilizer combinations of the invention may also be useful in thermoset resins, in the presence or absence of impact modifiers, fillers or reinforcements, and to elastomers including but not limited to EPR, EPDM, and acrylic elastomers.

The following example will serve to illustrate the invention in more detail.

EXAMPLE (I) The graft copolymers employed in this example were prepared as described in U.S. Pat. No. 4,202,948 (Example 2) except for changes in the polymerization antioxidant.

A 10-gallon jacketed autoclave equipped with a thermometer and a motor stirrer is charged with 413 parts by weight of water, 0.27 parts by weight of Methocel K-100 (trademark; hydroxypropyl methylcellulose produced by Dow Chemical Company) 100 parts by weight of ethylene-propylene-5-ethylidene-2-norbornene copolymer of 60/30 ethylene/propylene ratio, 20 iodine number and 68 ML-4 at 257° F. which has been ground to a Tyler mesh particle size 3, and a mixture of 75 parts by weight of styrene, 40 parts by weight of acrylonitrile, 3 parts by weight of Lupersol-11 (trademark; 75% t-butylperoxy pivalate in mineral spirits) as a polymerization initiator, and 1.0 part of antioxidant as described in Table 1.

The antioxidants in Table I not previously identified are as follows:
Irganox 1010 (trademark) tetrakis[methylene(3,5-di-tert-butyl-4-hydroxyhydrocinnamate)]methane
Paraplex G62 (trademark) expoxidized soybean oil
Compound A—2 stearamidoethyl 3-(3,5-di-tertiary-butyl-4-hydroxyphenyl)propionate
Compound B—2-stearamido-2-methylpropyl-3-(3,5-di-tertiary-butyl-4-hydroxyphenyl)propionate
Compound C—2-[3-(3,5-di-tertiary-butyl-4-hydroxyphenyl)propionamido]ethyl stearate
Compound D—2-[3-(3,5-di-tertiary-butyl-4-hydroxyphenyl)propionamido]-2-methylpropyl stearate
DTDTDP ditridecylthiodipropionate The reaction mixture is heated to 80° F. for 1½ hours and then to 240° F. and kept as this temperature for another 1½ hours at which time the reaction mixture is cooled to room temperature and the graft copolymer recovered by filtering and drying overnight in an oven at 66° C.

(II) To make the gum plastic blends 46 parts of graft copolymer 53 parts of SAN resin (Tyril 880B from Dow Chemical), and 0.75 parts each of Tinuvin P and Tinuvin 770 (UV stabilizers from Ciba-Geigy) were fluxed for 10 minutes at 90 rpm in a Rheocord (trademark) Type M Torque Rheometer made by Haake, Inc. and equipped with cam rotors.

Specimens were prepared for outdoor exposure by compression molding at 30,000 psi in a hydraulic press heated with steam to 360° F.

Samples were exposed outdoors in Miami, Fla. at a 45° angle to horizontal and facing south. Samples were generally exposed for periods of 1, 2, 4, 6, 9 and 12 months in Florida. Returned samples were inspected for yellowing after each exposure period and stored indoors. Periodically the stored samples were inspected for yellowing. Samples listed in Table 1 as yellowing would form a distinct yellow color after 1 to 3 months Florida exposure followed by 2-4 weeks indoor storage.

Graft samples passing the exposure test were also tested for heat stability. Heat stability of the graft is an important characteristic for a commercially useful graft as it must survive drying and compounding operations without significant darkening or other color change.

Heat stability data is given in Table 2. For the oven aging test, graft samples were placed into a forced air oven for two hours at 180° C. The degree of discoloration (darkening) was evaluated visually and given a "pass" or "fail" rating.

Oxygen induction time is another measure of thermal stability of the graft and this data is also given in Table 2. Graft samples were cold milled to form a blanket and placed in the chamber of a Differential Scanning Colorimeter heated to 375° F. with a flow of pure oxygen. The test value is reported as the number of minutes for an exotherm to occur.

In Table I, runs 15-22 represent the practice of the invention. Runs 1-14, which are outside the invention, are included for purposes of comparison only. Run 1, containing Irganox 1076 does not yellow upon exposure but is unsatisfactory because it does not retain good physical properties upon ageing. Run 2, containing Irganox 1076 and Tinuvin 770 (0.75 part) turns yellow, as does run 3 which additionally contains Tinuvin P (0.75 part). Run 4 containing Tinuvin P does not yellow but the composition does not have satisfactory weatherability. Runs 5–10, all containing Irganox 1076, a hindered amine (0.75 part) and various UV absorbers (0.75 part) all turn yellow. Substitution of Irganox 1010 (run 11), Paraplex G-62 (run 12), Compound A (run 13) or Compound B (run 14) as the antioxidant likewise results in a yellow color. When a hindered amine UV stabilizer is present (runs 2, 3 and 5–14), the composition turns yellow. Surprisingly, use of Compound C (run 15), Compound D (run 16), Irganox 1035 (run 17), Irganox 1093 (run 18), both Irganox 1035 and 1093 together (1:1 ratio, run 19), Naugard XL-1 (run 21), or Irganox 1098 (run 22) avoids the yellowing. Also non-yellowing is the combination of Irganox 1035/1093 with Tinuvin 144 plus Tinuvin P (run 20). All of runs 15–22 of the invention have good weatherability.

Runs 19 and 21 in Tables 1 and 2 represent a preferred practice of the invention. It is seen that these runs provided a non-yellowing blend which passed the oven aging test and also had a long oxygen induction time. Run 20 represents another preferred practice.

TABLE I

Exposure Yellowing of Blends

| Run | Antioxidant | UV Stabilizer Package | Exposure Yellowing |
|---|---|---|---|
| 1 | Irganox 1076 | None | No |
| 2 | Irganox 1076 | Tinuvin 770 | Yes |
| 3 | Irganox 1076 | Tinuvin 770 + Tinuvin P | Yes |
| 4 | Irganox 1076 | Tinuvin P | No |
| 5 | Irganox 1076 | Tinuvin 144 | Yes |
| 6 | Irganox 1076 | Tinuvin 144 + Tinuvin P | Yes |
| 7 | Irganox 1076 | Tinuvin 770 + Cyasorb UV 5411 | Yes |
| 8 | Irganox 1076 | Tinuvin 770 + Cyasorb UV 531 | Yes |
| 9 | Irganox 1076 | Tinuvin 770 + Tinuvin 327 | Yes |
| 10 | Irganox 1076 | Tinuvin 770 + AM 340 | Yes |
| 11 | Irganox 1010 | Tinuvin 770 + Tinuvin P | Yes |
| 12 | Paraplex | Tinuvin 770 + Tinuvin P | Yes |
| 13 | Compound A | Tinuvin 770 + Tinuvin P | Yes |
| 14 | Compound B | Tinuvin 770 + Tinuvin P | Yes |
| 15 | Compound C | Tinuvin 770 + Tinuvin P | No |
| 16 | Compound D | Tinuvin 770 + Tinuvin P | No |
| 17 | Irganox 1035 | Tinuvin 770 + Tinuvin P | No |
| 18 | Irganox 1093 | Tinuvin 770 + Tinuvin P | No |
| 19 | Irganox 1035/Irganox 1093 | Tinuvin 770 + Tinuvin P | No |
| 20 | Irganox 1035/Irganox 1093 | Tinuvin 144 + Tinuvin P | No |
| 21 | Naugard XL-1 | Tinuvin 770 + Tinuvin P | No |
| 22 | Irganox 1098 | Tinuvin 770 + Tinuvin P | No |

TABLE 2

Heat Stability of Graft Copolymer

| Run | Antioxidant | Oven Test | Oxygen Induction Time |
|---|---|---|---|
| 1 | Irganox 1076 | Pass | 18 |
| 17 | Irganox 1035 | Fail | 84 |
| 18 | Irganox 1093 | Pass | 5 |
| 19 | Irganox 1035/1093 (1/1) | Pass | 36 |
| 21 | Naugard XL-1 | Pass | 12 |

We claim:

1. A polymer composition normally subject to yellowing comprising a blend of (I) and (II) as defined below said composition being protected against yellowing by an antioxidant-UV stabilizer combination (A) and (B) as defined below, (I) being a graft copolymer of resin-forming monomeric material comprising a vinyl aromatic, alkenoic nitrile, ester or acid, or mixture thereof, on a rubbery EPM or EPDM spine, and (II) being separately prepared resin made from said monomeric material, wherein (I) is prepared in the presence of (A) an antioxidant mixture of (i) a thiodialkylene bis(3,5-dialkyl-4-hydroxy)hydrocinnamate and (iii) O,O-dialkyl-3,5-dialkyl-4-hydroxybenzyl phosphonate; the blend of (I) and (II) further containing (B) a UV stabilizer package comprising:
 (vi) at least one UV stabilizer of the hindered amine type, with or without
 (vii) at least one UV absorber.

2. A polymer composition as in claim 1 in which (A) is an antioxidant mixture of (i) thiodiethylene bis(3,5-di-tert-butyl-4-hydroxy)hydrocinnamate and (iii) O,O-di-n-octadecyl-3,5,di-tert-butyl-4-hydroxybenzyl phosphonate.

3. A polymer composition as in claim 1 in which (A) is thiodiethylene bis(3,5-di-tert-butyl-4-hydroxy)hydrocinnamate in admixture with O,O-di-n-octadecyl-3,5-di-tert-butyl-4-hydroxybenzyl phosphonate and (B) is bis(2,2,6,6-tetramethyl-4-piperidyl)sebacate and 2(2'-hydroxy-5'-methylphenyl)benzotriazole.

4. A polymer composition as in claim 1 in which (A) is thiodiethylene bis(3,5-di-tert-butyl-4-hydroxy)hydrocinnamate in admixture with O,O-di-n-octadecyl-3,5-di-tert-butyl-4-hydroxybenzyl phosphonate and (B) is bis(1,2,2,6,6-pentamethyl-4-piperdinyl)-n-butyl-(3,5-di-tert-butyl-4-hydroxybenzyl)malonate and 2(2'-hydroxy-5'-methylphenyl)benzotriazole.

5. A polymer composition normally subject to yellowing comprising a blend of (I) and (II) as defined below, said composition being protected against yellowing by an antioxidant-UV stabilizer combination comprising (A) and (B) as defined below, (I) being a graft copolymer of resin-forming monomeric material comprising a vinyl aromatic, alkenoic nitrile, ester or acid, or mixture thereof, on a rubbery EPM or EPDM spine, and (II) being separately prepared resin made from said monomer material, wherein (I) is prepared in the presence of
(A) 2,2'-oxamido bis ethyl-3-(3,5-di-tert-butyl-4-hydroxyphenyl)propionate; the blend of (I) and (II) further containing
(B) bis(1,2,2,6,6-pentamethyl-4-piperidinyl)-n-butyl-(3,5-di-tert-butyl-4-hydroxybenzyl)malonate and 2(2'-hydroxy-5'-methylphenyl)benzotriazole.

6. A polymer composition normally subject to yellowing comprising a blend of (I) and (II) as defined below, said composition being protected against yellowing by an antioxidant-UV stabilizer combination comprising (A) and (B) as defined below,
 (I) being a graft copolymer of resin-forming monomeric material comprising a vinyl aromatic, alkenoic nitrile, ester or acid, or mixture thereof, on a rubbery EPM or EPDM spine, and
 (II) separately prepared resin made from said monomeric material,
wherein (I) is prepared in the presence of
(A) 2,2'-oxamido bis ethyl-3-(3,5-di-tert-butyl-4-hydroxyphenyl)propionate; the blend of (I) and (II) further containing
(B) bis(2,2,6,6-tetramethyl-4-piperidyl)sebacate and 2(2'-hydroxy-5'-methyl-phenyl)benzotriazole.

7. In an impact resistant thermoplastic gum plastic blend of
 (I) a graft copolymer of styrene and acrylonitrile on EPDM rubber, and
 (II) separately prepared styrene-acrylonitrile resin, the improvement wherein (I) is prepared in the presence of antioxidant (A) and the blend of (I) and (II) includes a UV stabilizer package (B), the said antioxidant (A) being (a) thiodiethylene bis(3,5-di-tert-butyl-4-hydroxy)hydrocinnamate in admixture with O,O-di-n-octadecyl-3,5-di-tert-butyl-4-hydroxybenzyl phosphonate or (b) 2,2'-oxamido bis ethyl-3-(3,5-di-tert-butyl-4-hydroxyphenyl)propionate, and the said UV stabilizer package (B) being (c) bis(2,2,6,6-tetramethyl-4-piperidyl)sebacate and 2(2'-hydroxy-5'-methylphenyl)benzotriazole; or (d) bis(1,2,2,6,6-pentamethyl-4-piperidinyl)-n-butyl-3,5-di-tert-butyl-4-hydroxybenzyl)malonate and 2(2'-hydroxy-5'-methylphenyl)benzotriazole.

8. A polymer composition normally subject to yellowing comprising a blend of (I) and (II) as defined below, said composition being protected against yellowing by an antioxidant-UV stabilizer combination (A) and (B) as defined below,
 (I) being a graft copolymer of resin-forming monomeric material comprising a vinyl aromatic, alkenoic nitrile, ester of acid, or mixture thereof, on a rubbery EPM or EPDM spine, and
 (II) being separately prepared resin made from said monomeric material,
wherein (I) is prepared in the presence of
(A) 2,2'-oxamido bis ethyl-3-(3,5-di-tert-butyl-4-hydroxyphenyl)propionate; the blend of (I) and (II) further containing
(B) a UV stabilizer package comprising:
 (vi) at least one UV stabilizer of the hindered amine type, and
 (vii) at least one UV absorber.

* * * * *

UNITED STATES PATENT AND TRADEMARK OFFICE
CERTIFICATE OF CORRECTION

PATENT NO. : 4,464,496

DATED : Aug. 7, 1984

INVENTOR(S) : THOMAS L. NEMZEK and BRENDAN J. GEELAN

It is certified that error appears in the above-identified patent and that said Letters Patent are hereby corrected as shown below:

Col. 7, line 65, for "blend" read --mixture--;

Col. 8, line 5, delete "separately prepared"; line 11, for "blend" read --mixture--; line 59, for "blend" read --mixture--; line 67, delete "separately prepared".

Col. 9, line 3, for "blend" read --mixture--; line 9, for "blend" read --mixture--; line 17, for "separately prepared" read --mixture--; line 24, for "methyl-phenyl" read --methylphenyl--; line 26, for "blend" read --mixture--; line 29, delete "separately prepared"; line 31, for "blend" read --mixture--.

Col. 10, line 14, for "blend" read --mixture--; line 22, delete "separately prepared"; line 26, for "blend" read --mixture--.

Signed and Sealed this

Twelfth Day of March 1985

[SEAL]

Attest:

DONALD J. QUIGG

Attesting Officer        Acting Commissioner of Patents and Trademarks